US012649183B2

(12) United States Patent
Vulp et al.

(10) Patent No.: US 12,649,183 B2
(45) Date of Patent: Jun. 9, 2026

(54) METHOD AND DEVICE FOR CONFIGURING A PRODUCTION PROCESS OF A ROTARY PRESS

(71) Applicant: Fette Compacting GmbH, Schwarzenbek (DE)

(72) Inventors: Sven Vulp, Klein Pampau (DE); Ina Petry, Hamburg (DE); Marten Klukkert, Hamburg (DE); Anna Novikova, Hamburg (DE); Johannes Helmel, Mölln (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 273 days.

(21) Appl. No.: 18/632,585

(22) Filed: Apr. 11, 2024

(65) Prior Publication Data

US 2024/0342794 A1 Oct. 17, 2024

(30) Foreign Application Priority Data

Apr. 11, 2023 (DE) ..................... 10 2023 109 039.9

(51) Int. Cl.
*B30B 15/26* (2006.01)
*B22F 3/00* (2021.01)
(Continued)

(52) U.S. Cl.
CPC ................ *B22F 3/03* (2013.01); *B22F 3/004* (2013.01); *B30B 11/005* (2013.01); *B30B 11/02* (2013.01); *B30B 15/0094* (2013.01); *B30B 15/26* (2013.01)

(58) Field of Classification Search
CPC ... B30B 15/0094; B30B 15/26; B30B 11/005; B30B 11/08; B30B 11/02; B30B 11/14;
(Continued)

(56) References Cited

U.S. PATENT DOCUMENTS 4,376,085 A 3/1983 Burry
6,319,435 B1 * 11/2001 Hinzpeter ........... B30B 15/0094 425/149
(Continued)

FOREIGN PATENT DOCUMENTS

DE 102007052552 A1 4/2009
JP 2019-111565 A 7/2019
(Continued)

OTHER PUBLICATIONS

Japanese Patent Office; Notice of Reason(s) for Resfusal; JP Application No. P2024-039394;Dispatch Date: Oct. 17, 2024; (3 pages).
(Continued)

*Primary Examiner* — Jimmy T Nguyen
(74) *Attorney, Agent, or Firm* — Barclay Damon LLP

(57) ABSTRACT

A method for configuring a production process of a rotary press includes storing a plurality of groups of parameter data in a database including a first group including component parameter data on components mounted in the rotary press, a second group including process parameter data on process parameters during operation of the rotary press, a third group including powder parameter data on powder properties of the powdered material to be pressed in the rotary press, and a fourth group including tablet parameter data on tablet properties of the tablets to be produced in the rotary press. The production process of the rotary press is configured by defining parameter data from the other of the four groups for specified parameter data from at least two of the four groups according to the correlation of the parameter data saved in the database.

17 Claims, 2 Drawing Sheets

(51) Int. Cl.

| | |
|---|---|
| ***B22F 3/03*** | (2006.01) |
| ***B30B 11/00*** | (2006.01) |
| ***B30B 11/02*** | (2006.01) |
| ***B30B 15/00*** | (2006.01) |

(58) Field of Classification Search

CPC ..... B30B 15/0005; B30B 15/06; B30B 15/14; B30B 15/302; B22F 3/03; B22F 3/004; G05B 19/0426; G06N 3/08; G06N 20/00; B29C 43/00; B29C 43/04; B29C 43/08; B29C 43/32; B29C 43/58; B29C 2043/043; B29C 2043/5808; B29C 2043/5825

See application file for complete search history.

(56) References Cited

U.S. PATENT DOCUMENTS

| | | | | |
|---|---|---|---|---|
| 6,325,609 B1 * | 12/2001 | Shimada | B30B 11/08 425/149 | |
| 8,361,360 B2 * | 1/2013 | Vogeleer | B30B 11/08 264/40.5 | |
| 2005/0200038 A1 | 9/2005 | Vogeleer et al. | | |
| 2006/0263461 A1 | 11/2006 | Mertens et al. | | |
| 2007/0029691 A1 | 2/2007 | Nakamura et al. | | |
| 2010/0038808 A1 | 2/2010 | Vogeleer et al. | | |
| 2014/0195036 A1 | 7/2014 | Lüdemann et al. | | |
| 2018/0229462 A1 | 8/2018 | Shimada et al. | | |

FOREIGN PATENT DOCUMENTS

| | | | |
|---|---|---|---|
| KR | 102018121347 | A | 11/2018 |
| WO | 2021058516 | A1 | 4/2021 |
| WO | 2021105277 | A1 | 6/2021 |
| WO | 2015045473 | A1 | 5/2025 |

OTHER PUBLICATIONS

Japanese Patent Office; Notice of Reason(s) for Resfusal; JP Application No. P2024-039394; Dispatch Date: Oct. 17, 2024; English Translation; (3 pages).

EP 24160965.0; European Search Report dated Sep. 12, 2024 (7 pages).

* cited by examiner

METHOD AND DEVICE FOR CONFIGURING A PRODUCTION PROCESS OF A ROTARY PRESS

CROSS REFERENCE TO RELATED INVENTION

This application is based upon and claims priority to, under relevant sections of 35 U.S.C. § 119, German Patent Application No. 10 2023 109 039.9, filed Apr. 11, 2023, the entire contents of which are hereby incorporated by reference.

TECHNOLOGICAL FIELD

The following disclosure relates to a method and device for configuring a production process of a rotary press. The rotary press comprises a rotor rotatably drivable by means of a rotary drive and the rotor has upper and lower punch guides. Upper pressing punches of the rotor are guided in the upper punch guide and lower pressing punches of the rotor are guided in the lower punch guide. The rotor has a die plate with cavities arranged between the punch guides. A filling apparatus is included by which powdered material is filled into the cavities of the die plate, and wherein the rotary press also comprises a pressing apparatus which, during operation, interacts with the upper and lower pressing punches to press the powdered material in the cavities of the die plate into tablets.

BACKGROUND

In rotary presses, a large number of upper and lower pressing punches are generally provided which are in each case assigned to one cavity of a die plate in pairs. During operation of the rotary press, the upper and lower pressing punches rotate together with the die plate, wherein their axial movement is controlled by means of control cams and is guided by means of upper and lower punch guides. During the course of the rotation, the die plate travels through various apparatuses of the rotary press, namely a filling apparatus, in which powder material to be pressed is filled into the cavities of the die plate, and a pressure apparatus, in which the upper and lower pressing punches are generally pressed into the cavities by means of upper and lower pressing rollers in order to press the powder material into tablets. After the pressure apparatus, the upper pressing punches are guided upward out of the cavities and the produced tablets in the cavities are pushed by the lower pressing punches onto the upper side of the die plate. By means of a scraper, for example, the tablets are then scraped off of the die plate into an output of the rotary press from where they are supplied for further processing.

The quality of the produced tablets, in particular the tablet hardness, the tablet density, etc., depends on both the machine hardware, i.e. the components mounted in the rotary press, as well as on process parameters during the tableting process such as for example the rotary speed of the rotor or a filling wheel of a filling apparatus. The powder characteristics of the powdered material to be pressed in the rotary press, for example its density or particle size distribution, also influence the properties of the produced tablets. Overall, the tablet quality is therefore influenced by a variety of factors which also mutually influence each other. Changing an individual influential factor, for example a different powdered material or a different powdered material composed of an active pharmaceutical ingredient (API) and one or more excipients, correspondingly requires the adaptation of more parameters to maintain the desired tablet quality.

Previously, the respective finding of the optimum parameters for a tableting process was based on personally-related expertise. In particular, the correct combination of different parameters of the rotary press for a tableting process is set by an experienced operator by using the results of a series of experiments.

However, safely reproducible and consistent results are not achieved by personally-related expertise. Rather, the process success depends on the individual operator. In addition, the optimization process consumes time and materials, in particular when there is a change of individual parameters. Since, for reasons of time, all possible parameter combinations usually cannot be tested with the aid of statistical test planning, it frequently cannot be ensured that, within the context of the tests carried out in the available time frame, the optimum setup for the respective process can be identified, and the optimum tablet quality can thereby be achieved.

Proceeding from the above-described prior art, the invention is therefore based on the task of providing a method and a device of the type mentioned at the onset with which the production process of the rotary press can be optimally configured for each desired tableting process in a reliable, simple and safely reproducible manner, even under changing parameters.

BRIEF SUMMARY OF THE INVENTION

An embodiment of a method for configuring a production process of a rotary press which includes storing a plurality of groups of parameter data are saved in a database. The groups include a first group with component parameter data on components mounted in the rotary press. A second group includes process parameter data on process parameters during operation of the rotary press. A third group includes powder parameter data on powder properties of the powdered material to be pressed in the rotary press, and a fourth group includes tablet parameter data on tablet properties of the tablets to be produced in the rotary press. The parameter data of the different groups saved in the database are correlated with each other such that parameter data of the other of four groups can be determined for specified parameter data from at least two of the four groups. In order to configure the production process of the rotary press, parameter data from the other of the four groups are defined for specified parameter data from at least two of the four groups according to the correlation of the parameter data saved in the database.

An embodiment of a device for configuring a production process of a rotary press includes a configuration apparatus. The configuring apparatus includes a database in which a plurality of groups of parameter data are saved. The plurality of groups includes a first group comprising component parameter data on components mounted in the rotary press, a second group comprising process parameter data on process parameters during operation of the rotary press, a third group comprising powder parameter data on powder properties of the powdered material to be pressed in the rotary press, and a fourth group comprising tablet parameter data on tablet properties of the tablets to be produced in the rotary press. The parameter data of the different groups saved in the database are correlated with one another such that parameter data of the other of the four groups can be determined for specified parameter data from at least two of the four groups. In order to configure the production process of the rotary press, the configuring apparatus defines component parameter data and/or process parameter data for specified powder parameter data and/or specified tablet parameters according to the correlation of the parameter data saved in the database.

The basic design of the rotary press, as it is used in the method according to the invention or, respectively, is the subject of the present invention, has been explained at the beginning. To enable a reproducible configuration of the rotary press for an optimum tableting process, it is proposed according to the invention to group parameter data relevant to the tableting process, namely the component parameter data characterizing the hardware components mounted in the rotary press, the process parameter data characterizing the process parameters during the operation of the rotary press, the powder parameter data characterizing the powder properties of the powdered material pressed in the rotary press, and the tablet parameter data characterizing the tablet properties of the tablets produced in the rotary press into one group each so that at least four groups of parameter data relevant to the tableting process in the rotary press are formed. These at least four groups of parameter data are saved in a database so that they are available reproducibly and retrievably at any time.

The parameter data of the four groups saved in the database are also correlated with each other in such a way that, given specified parameter data from at least two of the four groups, for example specified powder parameter data and tablet parameter data, the parameter data of the other of the four groups, for example the component parameter data and the process parameter data, can be determined. Of course, based on the correlation, parameter data of the other of the four groups can also be determined for specified parameter data from three of the four groups. To configure the production process, parameter data from the other four groups are defined for specified parameter data from at least two of the four groups based on the correlation of the parameter data saved in the database. For example, to configure the production process in the rotary press, component parameter data and/or process parameter data can be defined based on the correlation of the parameter data saved in the database for predefined powder parameter data and/or predefined tablet parameter data. In particular, the component parameter data and process parameter data resulting from the correlation saved in the database can be determined for specified tablet parameter data, in particular target tablet parameter data specified for a desired tablet quality, taking into account powder parameter data that are specified because they are fixed for the powdered material to be pressed. The process parameter data are generally adjustable and can be correspondingly selected so that the desired tablet quality, in particular with the desired tablet parameter data, results for the specified powdered material with its powder parameter data during operation of the rotary press. In addition, the component parameter data can also be adjusted within certain limits. For example, filling wheels of the filling apparatus or other components can be flexibly selected.

The invention is therefore based on the insight that parameter data of one or two groups can be determined from a certain combination of parameter data of the other groups such that the specified or, respectively, desired result of the production process is achieved in the rotary press, in particular the desired tablet parameter data, and therefore the specified tablet quality. Normally, it is assumed that the powdered material with its powder parameter data is defined for a specified production process. The tablet parameter data as well are defined as target values to achieve the desired tablet quality. The process parameter data and the component parameter data can be set. Due to the correlation in the database according to the invention, these can be defined in such a way that the desired tablet quality is achieved for the respective powdered material.

To the extent that specified or determined or predicted parameter data of a group is mentioned in the present case, this includes the possibility of all or only some of the parameter data saved in the respective group. In particular, component parameter data and optionally also process parameter data can be partially defined and partially adjustable. The correlation of the parameter data of the groups can also include all or just some of the parameter data of the group(s). Of course, the correlation is all the better the more parameter data of the respective group are included in the correlation.

By saving the groups of parameter data in a database and correlating the data in the database according to the invention, the result of the configuration is easy to achieve and reliably reproducible for the respective production process. Once the parameter data have been saved and correlated in the database, no involved series of tests are subsequently required to find the respective optimum configuration. Finding the optimum configuration for the respective production process, for example in the context of process development and corresponding to the later rotary press configuration process, is independent of personally-relation expertise and can therefore be done safely and in a reliably reproducible manner.

The data output of the parameter data determined or, respectively, specified according to the invention, for example the process parameter data, can be provided to an operator on a display device, for example a dashboard. The display device can be arranged stationary on or in the proximity of the rotary press. However, it can also be formed on a PC, a tablet or a smartphone. It is also conceivable for the parameter data defined in the context of the configuration of the production process, for example the process parameter data, to be automatically set, in particular by the configuration apparatus of the rotary press according to the invention. According an embodiment, with the assistance of the database correlation, an ideal machine configuration can be predicted, in particular the component parameter data as well as the process parameter data, for the respective production process based on for example specified powder parameter data and specified tablet parameter data. Especially the powder parameter data are of key importance for the success of the tableting process and have previously been nearly impossible to take into account in a reliably reproducible manner in previous processes or, respectively, rotary presses. As explained, the production process can be configured before the actual production process in a rotary press. The results of the configuration can then be corresponding used in the later production process. It is however also possible for the configuration according to the invention to be performed directly on the rotary press for the production process, i.e. including the actual machine configuration.

Overall, the invention achieves an improvement the quality of the tablets, which can for example be oral solid dosages (OSD), and a saving in time and costs. A reliably reproducible and documentable prediction to improve the tableting process, and therefore a more efficient process, is possible, in particular a prediction of the process for the “best” tablet, i.e. the tablet that corresponds with all the required characteristics, wherein there is minimum variability between the tablets in a batch. Furthermore, standardization of the work process is achieved.

As already explained, according to one embodiment, it is possible to predict the parameter data of the other of the four groups for specified parameter data from at least two of the four groups corresponding to the correlation of the parameter data saved in the database. By using corresponding algorithms, as explained in more detail below, it is in particular possible to predict the parameter data even for parameter combinations that have not yet been experimentally investigated in the context of test series. This also achieves a further simplification of the configuration of a rotary press, in particular for not yet been investigated parameter combinations.

The component parameter data can include, for example, the type of pressing punch, die plate, filling apparatus and/or pressing apparatus mounted in the rotary press. This includes, for example, the number, diameter, the length, the punch head and/or punch tip geometry of the mounted pressing punches. Furthermore, this includes, for example, whether the die plate is constructed in one piece or from ring segments and/or the number and/or geometry of the cavities of the die plate, as well as, for example, whether the cavities are designed directly as holes in the die plate or in die inserts inserted into the die plate. This also includes, for example, the type of filling apparatus, for example the geometry of a filling chamber of the filling apparatus and/or the presence of one or more rotationally driven filling wheels as well as the geometry (geometries) of the filling wheel(s). Furthermore, this includes, for example, the number and type of pressing apparatuses, in particular the type of upper and lower pressing rollers and/or the presence of pre- and main pressing apparatuses. The presence of a plurality of filling and/or pressing devices for the production of multilayer tablets is also included by the component parameter data, for example. Of course, the component parameter data can also include other components of the rotary press, for example upper and/or lower control cams for the pressing punches, in particular filling cams, as well as an ejector apparatus and its components and seals or, respectively, sealing segments.

The process parameter data can include, for example, the rotary speed of the rotor, the rotary speed of at least one filling wheel of the filling apparatus, and/or the pressing force of the pressing apparatus. To the extent that filling apparatuses have filling wheels, they are often rotatably driven for improved powder availability. The rotary speed of the filling wheels has an influence on the filling of the cavities of the die plate with powdered material. The pressing force is the pressing force exerted due to the interaction of the pressing apparatus, in particular the upper and lower pressing rollers, with the upper and lower pressing punches when pressing the powdered material. It also has a decisive influence on the tableting result.

As already noted, the invention is also based on the insight that the powder parameter data, in particular the selection of the considered powder parameter data as well as the powder characterization methods, are of key importance for a meaningful use of the database with regard to predictions of the tableting result. The basic database for a suitable prediction or, respectively, configuration of the production process of the rotary press only exists if the parameter values decisive for the tableting process are recorded correctly. With regard to the powder parameter data that are particularly relevant in this respect, the analytical methods for recording the powder properties should be predictive as a whole for, among other things, the flow properties, the compressibility, the compactibility, the tableting ability and the adhesiveness of the powder. The selection of measurement methods for the powder parameters must also be suitable for a meaningful comparison of different powders. In pharmaceutical quality control, there is usually a separate method development for each powdered material provided that it is not a so-called conventional method. Within the context of method development for the respective powder parameter, the settings of the variable quantities are selected such that the relevant properties of the respective powdered material are recorded with corresponding reliability. In principle, it should be noted that the powdered material to be pressed is generally an unchanging input quantity of the production process of the rotary press. For the configuration of the production process, it is therefore essential to know and understand the powder technological properties of the starting product that are relevant for the respective process. The challenge in method development for the database according to the invention is to find a method for recording powder parameter data that is suitable for as many powdered materials as possible to ensure on the one hand comparability of the powdered materials and on the other hand, to be predictive of the behavior of the powdered material during tableting.

On the basis of these findings, the powder parameter data can include the powder volume, the powder density, the particle size distribution, the moisture content and/or the drying loss of the powdered material. The powder volume and the powder density, in particular the bulk and tapped volume as well as the also particularly important bulk and tapped density, including derived variables such as the Hausner factor and Carr index as well as the angle of repose, serve to characterize the flowability of the powdered material, which is important for the tableting process. The (residual) moisture or, respectively, loss on drying is also important for the flow behavior and can, for example, be measured by means of an infrared or halogen scale. On the other hand, these parameter data are also important for the tabletability or, respectively, mechanical strength of the resulting tablet. The particle size distribution is predictive of the flow behavior as well as the compressibility and compactibility of the powdered material. For example, when determining the particle size distribution by means of laser diffractometry, a suitable dispersion pressure must be determined that is capable of optimally atomizing the powdered material in order to deliver meaningful results for the intended purpose. For example, the complete particle size distribution can be measured.

A powder parameter recognized as relevant by the present inventors is moreover the water activity of the powdered material. Similar to the loss on drying, the water activity has an influence on the flow behavior and the tabletability of the powdered material. While the loss on drying measures the total water contained in the powdered material, the water activity only measures the share of available water in the powdered material in comparison with the water content at full saturation. The inventors have recognized that water activity is more suitable for predicting the tableting properties of the powdered material than the loss on drying. Another advantage of water activity is that substantially all powdered materials are suitable for determining this parameter under the same conditions. In contrast, not all powdered materials are suitable for a meaningful determination of the drying loss. Effervescent powder is a good example.

According to the knowledge of the inventors, the aforementioned powder parameter data achieves a suitable equilibrium between data quality, in particular sufficient detection of the powder parameter data for the correlation or, respectively, configuration according to the invention on the one hand, and the practicability, in particular the length of measurement and the associated effort on the other hand.

Beyond the aforementioned powder parameter data or, respectively, measurement methods, other powder parameter data or measurement methods can be useful. Examples of these are: other methods for flowability characterization such as "flow through an orifice"; determination of the true density of the powders by means of helium pycnometry; this can provide even more precise information on compressibility and compactibility; determine the flow by means of a ring shear cell or powder rheometry, which may deliver even more precise information on flowability under certain circumstances; particle size determination with imaging methods such as for example scanning electron microscopy or dynamic image analysis; in addition to determining the particle size, information about the particle shape would also be collected here which can be predictive of flow properties, compressibility and compactibility as well as tabletability; powder compaction analyses; while the other cited methods describe compressibility, compactibility and tabletability somewhat indirectly, there are also possibilities to collected these data directly. Such data could also be included in the database, or (similar to particle size distribution) certain characteristic quantities could be recorded and used together with any derived quantities for analytical purposes. In this way, other informational content could be obtained regarding compressibility and compactibility as well as tabletability and adhesiveness.

The tablet parameter data can include, for example, the tablet hardness, the tablet density and/or the tablet size of the tablets to be produced or, respectively, tablets produced in the rotary press, as already explained.

According to a particularly practical embodiment, the parameter data saved in the database, including the correlation of the parameter data if necessary, can be determined experimentally as part of a series of tests. For example, the correlation of the parameter data can be determined experimentally in that the resulting tablet parameter data are measured for combinations of component parameter data, process parameter data and powder parameter data changed in the context of the test series. Various combinations of parameter data from the different groups can hence be set through test and/or production runs, and the resulting tablet parameter data for a certain powdered material, for example, can be determined. The parameter data determined in the context of the test series are saved, correspondingly correlated, in the database together with the powder parameter data.

In principle, the powder parameter data and/or the tablet parameter data can be determined both outside the production process of the rotary press as well as inside the production process of the rotary press, or, respectively, outside the rotary press as well as inside the rotary press. For example, a determination can take place outside of the production process of the rotary press, or, respectively, outside the rotary press in a laboratory separate from the rotary press. Recording in the production process can be in-line, on-line or at-line. When recording the parameter data in the production process or, respectively, in the rotary press, for example, tablet parameter data are measured in a measuring system connected to the rotary press, which reports back the corresponding measurement results of the powder parameter data, for example to the configuration apparatus, which correspondingly saves them in the database. Powder parameter data can, for example, be determined in a laboratory separate from the rotary press and also saved in the database, in particular automatically. In principle, however, measurements of powder parameter data during the production process in the rotary press are also conceivable.

The parameter data saved in the database can be correlated by means of an algorithm saved in an evaluation apparatus. As explained at the onset, with the evaluation apparatus or, respectively, the algorithm saved therein, parameter data combinations of the various groups that have not yet been experimentally recorded can in principle also be correlated, in particular with algorithms as explained in more detail below. Automatic configuration of the rotary press for the respective production process is also possible, in particular with the configuration apparatus. The evaluation apparatus can be part of the rotary press, for example integrated into the machine control, or be separate therefrom, for example on a PC, a tablet or a smartphone. The evaluation apparatus can also be integrated into the configuration apparatus. The database can be integrated in the configuration apparatus or in the evaluation apparatus, or can be separate therefrom.

The algorithm can comprise an algorithm of machine learning. In particular, a self-learning algorithm can be saved in the evaluation apparatus, which (continuously) adapts or, respectively, optimizes the correlation of the parameter data saved in the database based on training data and/or empirical data from the operation of the rotary press. The machine learning algorithm can, for example, include neural networks.

The parameter data saved in the database can be correlated according to another embodiment using multivariate data analysis. Multivariate data analyses allow a plurality of parameters, in this case the parameter data of the different groups, to be examined simultaneously and evaluated with respect to their correlation. With multivariate data analysis, information relevant in particular for the correlation of the parameter data can be distinguished from information that is irrelevant in this regard.

The multivariate data analysis can include a principal components analysis according to a particularly practical embodiment. With principal components analysis (PCA), data relevant to the question at hand, in this case the correlation of the parameter data of the different groups, can be identified, and it can be separated from information that is not relevant to the question at hand in a particularly reliable manner. Within the framework of principal components analysis, at least one principal component can be identified for the parameter data of each group, which has the greatest variance in relation to the correlation of the parameter data of the different groups. The principal component(s) with the greatest variance contain(s) the most information with respect to the correlation of the parameter data and are therefore very relevant to the question at hand. By reducing the parameter data to at least one primary component per group, for example to two or three primary components per group, a reliable correlation of the parameter data can still be made while substantially simplifying the data volume and therefore the evaluation.

The multivariate data analysis can also comprise a multivariate regression method, for example a partial least square regression (PLS/PLSR) method, in order to be able to form models for correlating the parameter data of the different groups.

The configuration apparatus according to the invention can be designed to carry out the method according to the invention. Likewise, the configuration apparatus, in particular its database including the correlation of the parameter data, can be designed according to the method according to the invention. The method according to the invention can be correspondingly performed with a device according to the invention.

The invention also relates to a rotary press comprising a device according to the invention.

BRIEF DESCRIPTION OF THE DRAWINGS

An exemplary embodiment of the invention is explained below in greater detail with reference to figures. They show schematically.

The same reference signs refer to the same objects in the figures unless indicated otherwise.

DETAILED DESCRIPTION OF THE INVENTION

Figure 1:
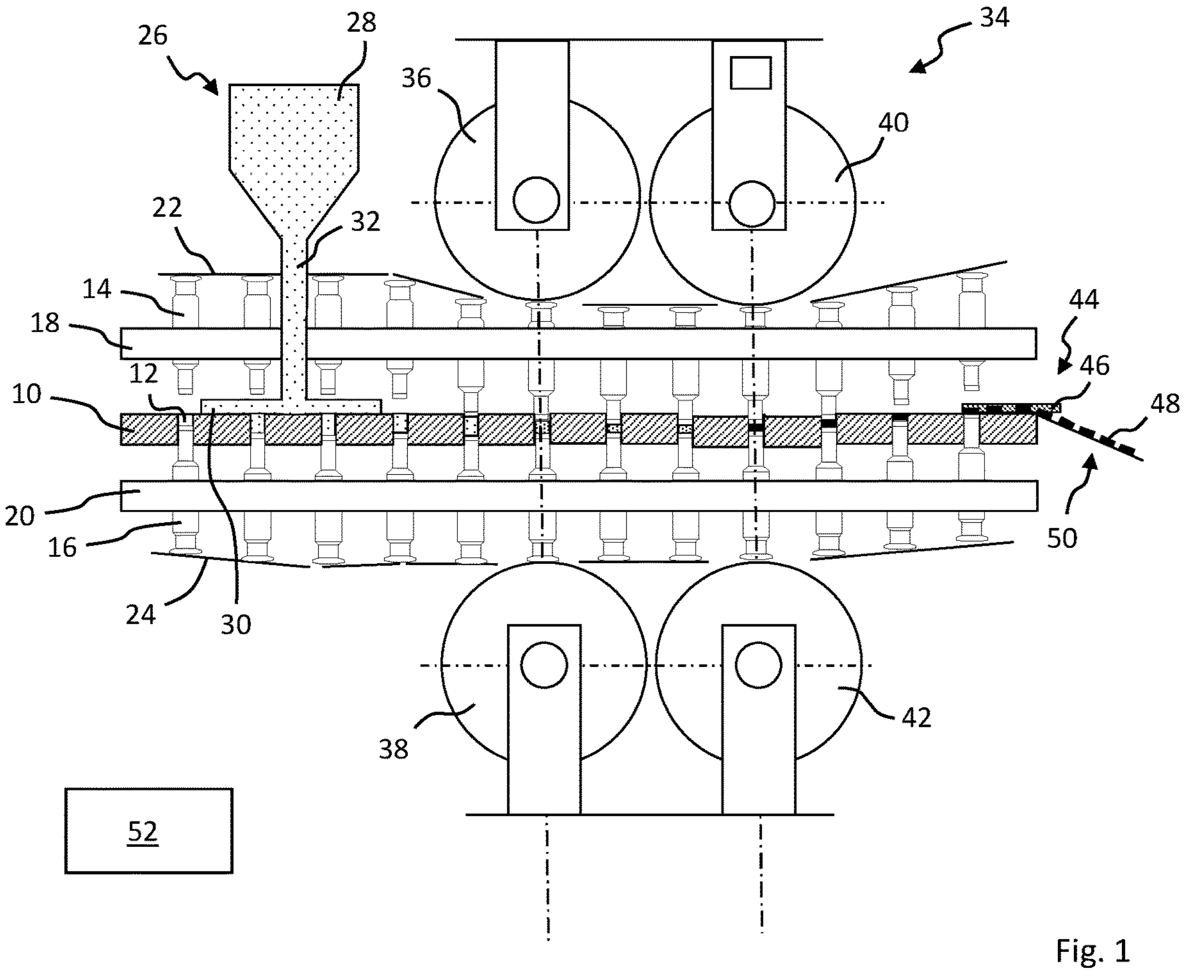
FIG. 1 illustrates a partial sectional view of an embodiment of a rotary press according to the invention.

The rotary press shown in FIG. 1 is a rotary press for producing tablets, in which powdered material is pressed into tablets. The rotary press comprises a rotor rotatingly driven by a rotary drive with a die plate 10 having multiple cavities 12. The cavities 12 can be formed, for example, by bores in the die plate 10. The rotor further comprises multiple upper pressing punches 14 and lower pressing punches 16 which revolve synchronously with the die plate 10. The upper pressing punches 14 are axially guided in an upper punch guide 18 and the lower pressing punches 16 are axially guided in a lower punch guide 20. The axial movement of the upper pressing punches 14 and lower pressing punches 16 in the course of the rotation of the rotor is controlled by upper control cam elements 22 and lower control cam elements 24. The rotary press further comprises a filling apparatus 26, which comprises a filling reservoir 28 and a filling chamber 30 which are connected via a filling pipe 32. In this manner, in the present example, powdered material arrives from the filling reservoir 28 via the filling tube 32 into the filling chamber 30 due to gravity and from there via a filling opening provided on the lower side of the filling chamber 30 into the cavities 12 of the die plate 10.

The rotary press further comprises a pressing apparatus 34. The pressing apparatus 34 comprises a pre-pressing apparatus having an upper pre-pressing roller 36 and a lower pre-pressing roller 38, as well as a main pressing apparatus having an upper main pressing roller 40 and a lower main pressing roller 42. Furthermore, the rotary press comprises an ejector apparatus 44 and a scraper apparatus 46 having a scraper element which supplies the tablets 48 produced in the rotary press to a discharge apparatus 50 for discharging from the rotary press. The scraper apparatus 46 can, for example, comprise a preferably crescent-shaped scraper element which scrapes tablets 48 conveyed by the lower pressing punches 16 onto the upper side of the die plate 10 in the region of the ejector apparatus 44 off of the die plate 10 and supplies them to the discharge apparatus 50.

The rotary press also comprises an evaluation apparatus 52 for controlling the operation of the rotary press and for carrying out the method according to the invention, as explained in greater detail below. The evaluation apparatus may include one or more processors and/or memory units that are in electrical communication with the rotary press. In an embodiment, the contents of the evaluation apparatus are contained by a housing. Together with the database formed in the evaluation apparatus 52 or separately from the evaluation apparatus 52, the evaluation apparatus 52 correspondingly forms a device according to the invention.

Figure 2:
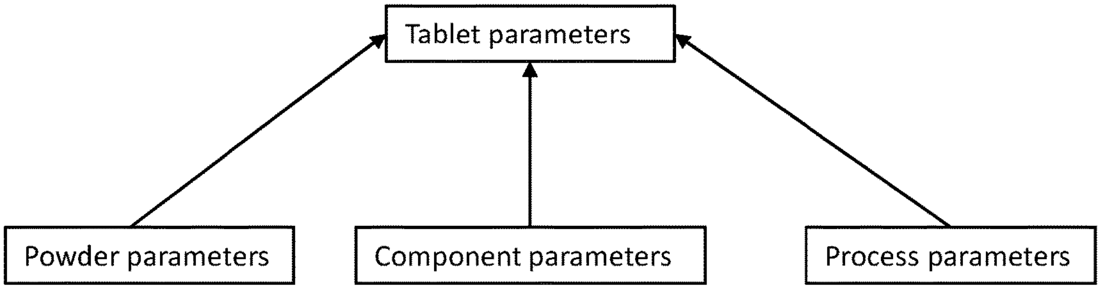
FIG. 2 is a flow chart illustrating the influence of various parameter data on the tablet parameter data according to the invention.
Figure 3:
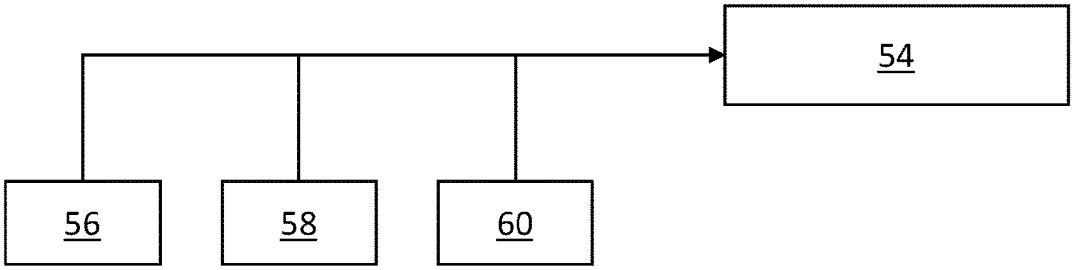
FIG. 3 illustrates an embodiment of the provision of data for the database used according to the invention.

FIG. 2 schematically shows how parameter data, in this case powder parameter data, component parameter data and process parameter data of the rotary press influence the tablet parameter data, i.e. the tablet quality of the tablets produced in the rotary press. FIG. 3 shows a database 54 contained in the evaluation apparatus 52, in which are saved the groups of parameter data according to the invention. FIG. 3 shows a plurality of clients 56, 58 and 60 which form data sources for storing the corresponding parameter data in the database 54, as shown by the arrow in FIG. 3. The clients 56, 58, 60 can, for example, be measuring devices in a laboratory and/or in or on the rotary press, which offer corresponding measurement data on parameter data, for example on powder parameter data or tablet parameter data, to the evaluation apparatus 52 which saves them corresponding to the respective groups in the database 54 formed in the evaluation apparatus 52 or separately from the evaluation apparatus 52 and correlates them as explained above.

Figure 4:
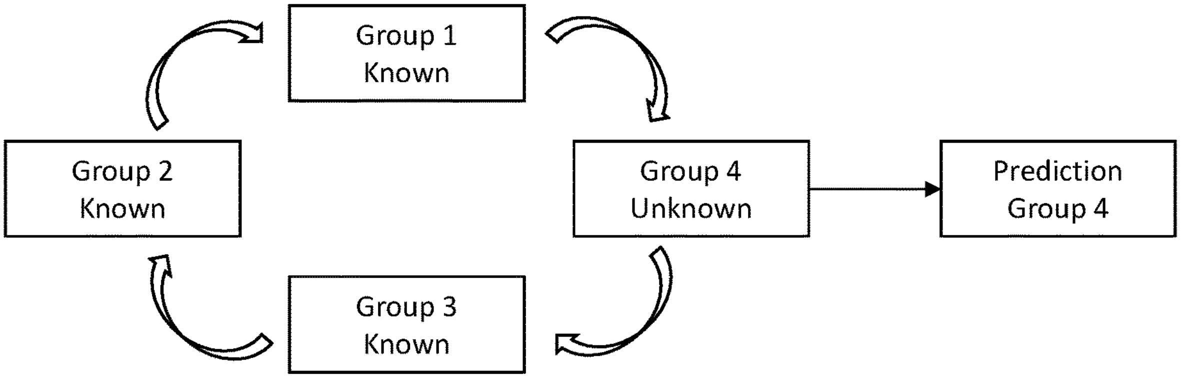
FIG. 4 illustrates an embodiment of a relationship between the parameter data of the different groups and the prediction of parameter data based thereon according to the invention.

In FIG. 4, the correlation of the parameter data of the four groups saved in the database 54 are represented by arrows. For example, based on the correlation of the parameter data of the various groups in the database 54, it is possible to predict the parameter data of group 4 for given parameter data of groups 1, 2 and 3, as schematically shown in FIG. 4 and as explained above. Based on the correlation according to the invention, it is also possible to predict the parameter data of groups 3 and 4, for example, for given parameter data of groups 1 and 2. The correlation can be determined experimentally by corresponding test series and/or determined by corresponding algorithms, for example algorithms of machine learning, including for combinations of parameter data that have not been determined experimentally.

On the basis of the parameter data saved and correlated in the database 54, the parameter data of the other groups can be defined for specified parameter data from at least two groups by means of a configuration apparatus 52 which can also be formed, for example, by the evaluation apparatus 52. For example, the defined parameter data of the group 3 can be component parameter data, and the parameter data of the group 4 can be process parameter data of the rotary press, which both can be set within certain limits depending on the respective process.

LIST OF REFERENCE SIGNS

10 Die plate
12 Cavities
14 Upper pressing punches
16 Lower pressing punches
18 Upper punch guide
20 Lower punch guide
22 Upper control cam elements
24 Lower control cam elements
26 Filling apparatus
28 Filling reservoir
30 Filling chamber

32 Filling tube
34 Pressing apparatus
36 Upper pre-pressing roller
38 Lower pre-pressing roller
40 Upper pressing roller
42 Lower pressing roller
44 Ejector apparatus
46 Scraper apparatus
48 Tablets
50 Discharge apparatus
52 Evaluation apparatus/configuration apparatus
54 Database
56 Client
58 Client
60 Client

The invention claimed is:

1. A method for configuring a production process of a rotary press, comprising:
providing a rotary press which comprises,
a rotor configured to be rotatably driven by a rotary drive,
upper and lower punch guides, wherein upper pressing punches of the rotor are configured to be guided in the upper punch guide and lower pressing punches of the rotor are configured to be guided in the lower punch guide,
a die plate defining a plurality of cavities positioned between the punch guides,
a filling apparatus configured to fill a powdered material into each of the plurality of cavities of the die plate, and
a pressing apparatus configured to interact with the upper and lower pressing punches to press the powdered material in each of the plurality of cavities of the die plate to form tablets;
storing a plurality of groups of parameter data in a database, wherein the plurality of groups of data comprises,
a first group comprising component parameter data on components mounted in the rotary press,
a second group comprising process parameter data on process parameters during operation of the rotary press,
a third group comprising powder parameter data on powder properties of the powdered material to be pressed in the rotary press, and
a fourth group comprising tablet parameter data on tablet properties of the tablets to be produced in the rotary press;
correlating the parameter data of each of the four groups with each other such that parameter data of another of four groups can be determined for specified parameter data from at least two of the four groups; and
configuring the production process of the rotary press by defining parameter data from the other of the four groups for specified parameter data from at least two of the four groups according to the correlation of the parameter data saved in the database.

2. The method according to claim 1, wherein configuring the production process of the rotary press further comprises defining at least one of: (i) component parameter data; and (ii) process parameter data for at least one of: (i) specified powder parameter data; and (ii) specified tablet parameters according to the correlation of the parameter data saved in the database.

3. The method according to claim 1, further comprising predicting the parameter data of the other of the four groups for specified parameter data from at least two of the four groups corresponding to the correlation of the parameter data saved in the database.

4. The method according to claim 1, wherein the component parameter data comprises at least one of: (i) the pressing punch mounted in the rotary press; (ii) the die plate; (iii) at least one filling wheel of the filling apparatus; (iv) the pressing apparatus; (v) control cams; and (vi) seals.

5. The method according to claim 1, wherein the process parameter data comprises at least one of: (i) a rotary speed of the rotor; (ii) a rotary speed of at least one filling wheel of the filling apparatus; and (iii) a pressing force of the pressing apparatus.

6. The method according to claim 1, wherein the powder parameter data comprises at least one of: (i) a powder volume; (ii) a powder density; (iii) a particle size distribution; (iv) a moisture content; and (v) a loss on drying of the powdered material.

7. The method according to claim 1, wherein the powder parameter data comprises a water activity of the powdered material.

8. The method according to claim 1, wherein the tablet parameter data comprises at least one of: (i) a tablet hardness; (ii) a tablet density; and (iii) a size of the tablets to be produced in the rotary press.

9. The method according to claim 1, wherein the parameter data saved in the database are experimentally determined within a context of test series.

10. The method according to claim 1, wherein at least one of: (i) the powder parameter data; and (ii) the tablet parameter data are determined outside the production process of the rotary press or within the production process of the rotary press.

11. The method according to claim 1, wherein the correlating of the parameter data saved in the database is done by an algorithm stored in an evaluation apparatus.

12. The method according to claim 11, wherein the algorithm comprises a machine learning algorithm.

13. The method according to claim 11, wherein the correlating of the parameter data saved in the database is done by a multivariate data analysis.

14. The method according to claim 13, wherein the multivariate data analysis comprises a principal components analysis.

15. The method according to claim 13, wherein the multivariate data analysis comprises a multivariate regression method.

16. A device for configuring a production process of a rotary press, comprising:
a configuration apparatus in communication with the rotary press, the rotary press comprising a rotor configured to be rotatably driven by a rotary drive; upper and lower punch guides, wherein upper pressing punches of the rotor are configured to be guided in the upper punch guide and lower pressing punches of the rotor are configured to be guided in the lower punch guide; a die plate defining a plurality of cavities positioned between the punch guides; a filling apparatus configured to fill a powdered material into each of the plurality of cavities of the die plate; and a pressing apparatus configured to interact with the upper and lower pressing punches to press the powdered material in each of the plurality of cavities of the die plate to form tablets;
the configuration apparatus comprising a database in which a plurality of groups of parameter data are stored, wherein the plurality of groups comprises:
- a first group comprising component parameter data on components mounted in the rotary press;
- a second group comprising process parameter data on process parameters during operation of the rotary press;
- a third group comprising powder parameter data on powder properties of a powdered material to be pressed in the rotary press; and
- a fourth group comprising tablet parameter data on tablet properties of the tablets to be produced in the rotary press, wherein the parameter data of the four groups stored in the database are correlated with one another such that parameter data or another of the four groups is determined for specified parameter data from at least two of the four groups, and wherein the configuration apparatus is configured to define parameter data from the other of the four groups for specified parameter data from at least two of the four groups according to the correlation of the parameter data saved in the database in order to configure the production process of the rotary press.

17. A rotary press comprising:

a rotor configured to be rotatably driven by a rotary drive;

upper and lower punch guides, wherein upper pressing punches of the rotor are configured to be guided in the upper punch guide and lower pressing punches of the rotor are configured to be guided in the lower punch guide;

a die plate defining a plurality of cavities positioned between the punch guides;

a filling apparatus configured to fill a powdered material into each of the plurality of cavities of the die plate;

a pressing apparatus configured to interact with the upper and lower pressing punches to press the powdered material in each of the plurality of cavities of the die plate to form tablets; and a configuration apparatus comprising a database in which a plurality of groups of parameter data are stored, wherein the plurality of groups comprises:
- a first group comprising component parameter data on components mounted in the rotary press;
- a second group comprising process parameter data on process parameters during operation of the rotary press;
- a third group comprising powder parameter data on powder properties of a powdered material to be pressed in the rotary press; and
- a fourth group comprising tablet parameter data on tablet properties of the tablets to be produced in the rotary press, wherein the parameter data of the four groups stored in the database are correlated with one another such that parameter data or another of the four groups is determined for specified parameter data from at least two of the four groups, and wherein the configuration apparatus is configured to define parameter data from the other of the four groups for specified parameter data from at least two of the four groups according to the correlation of the parameter data saved in the database in order to configure the production process of the rotary press.

* * * * *